United States Patent
Soler et al.

(10) Patent No.: US 7,023,581 B2
(45) Date of Patent: Apr. 4, 2006

(54) COMPENSATING FOR DRIFT AND SENSOR PROXIMITY IN A SCANNING SENSOR, IN COLOR CALIBRATING INCREMENTAL PRINTERS

(75) Inventors: Pau Soler, Barcelona (ES); Roger Vinas, Barcelona (ES); Francisco Javier Rodriguez, Barcelona (ES); Francesc Subirada, Castellbisbal (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 784 days.

(21) Appl. No.: 09/919,260

(22) Filed: Jul. 30, 2001

(65) Prior Publication Data

US 2003/0020972 A1     Jan. 30, 2003

(51) Int. Cl.
  *B41J 1/00*         (2006.01)
  *G06F 15/00*        (2006.01)
  *H04N 1/46*         (2006.01)

(52) U.S. Cl. .................. 358/1.9; 358/518; 358/504
(58) Field of Classification Search ................ 358/1.1, 358/1.2, 3.26, 1.12, 500, 494, 474, 448, 518, 358/1.9, 504, 1.6; 382/167, 162, 1.9, 504; 347/19
See application file for complete search history.

(56) References Cited

U.S. PATENT DOCUMENTS

| 5,185,673 | A  | * | 2/1993  | Sobol .......................... 358/296 |
| 5,353,052 | A  | * | 10/1994 | Suzuki et al. .................. 347/19 |
| 5,809,213 | A  | * | 9/1998  | Bhattacharjya ............. 358/1.6 |
| 6,167,150 | A  | * | 12/2000 | Michael et al. ............. 382/149 |
| 6,196,652 | B1 | * | 3/2001  | Subirada et al. ............. 347/19 |
| 6,345,876 | B1 | * | 2/2002  | Tanaka et al. ................ 347/19 |
| 6,603,574 | B1 | * | 8/2003  | Ramirez et al. ............. 358/1.9 |
| 6,690,485 | B1 | * | 2/2004  | Borrell et al. ............... 358/1.9 |
| 6,788,431 | B1 | * | 9/2004  | Yamaguchi ................. 358/1.9 |
| 6,799,823 | B1 | * | 10/2004 | Miquel et al. ................ 347/15 |
| 2003/0016263 | A1 | * | 1/2003 | Takahashi et al. ............ 347/19 |

* cited by examiner

*Primary Examiner*—Kimberly Williams
*Assistant Examiner*—Charlotte M. Baker
(74) *Attorney, Agent, or Firm*—Peter I. Lippman

(57) ABSTRACT

To compensate for color-calibration sensor drift, a measurement of bare-print-medium tonal value is taken in immediate time juxtaposition to each color test pattern; measured bare-medium tone is then used to correct color-patch readings. A line sensor or the like, on the scanning printhead carriage, is used for the reading. Preferably two such readings are taken, one at each end of each test pattern; ideally separate scans of the bare medium are taken without any test-pattern patch to develop longterm and short-term drift profiles, for refining the corrections. To compensate for calibration error due to runout in the carriage track—particularly for wide-bed printers—sensor response to bare medium is used to represent variations in carriage-to-medium spacing along the track; these variations are corrected in later sensor use.

40 Claims, 5 Drawing Sheets

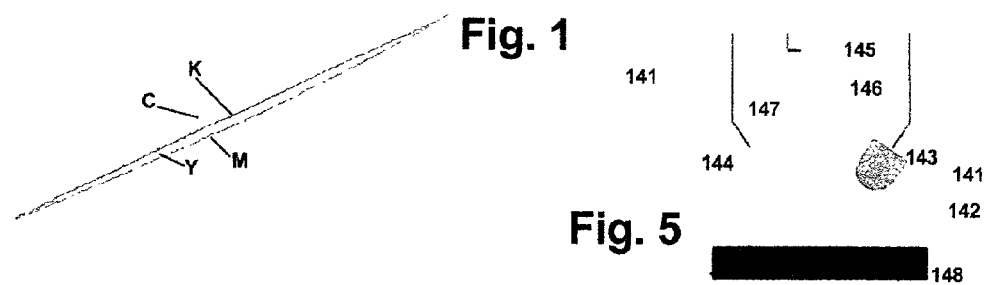
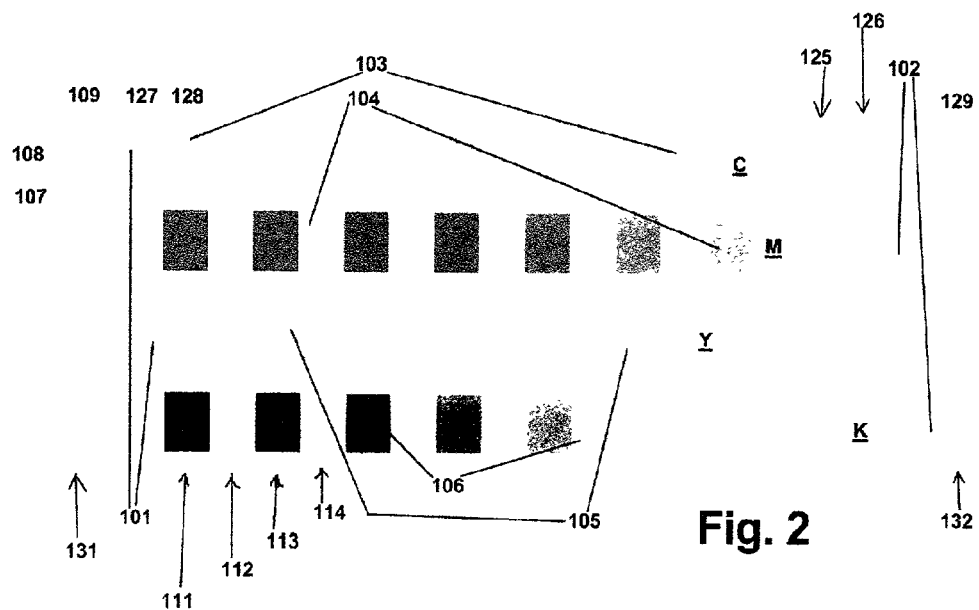
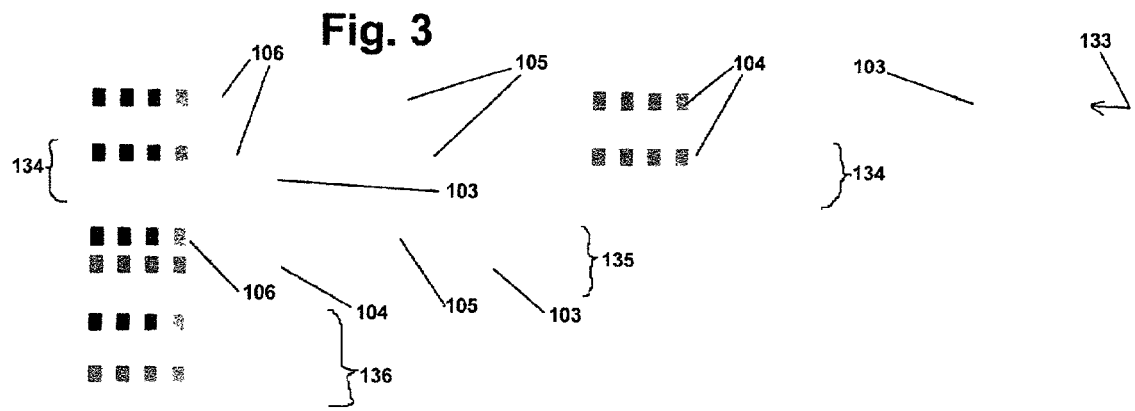

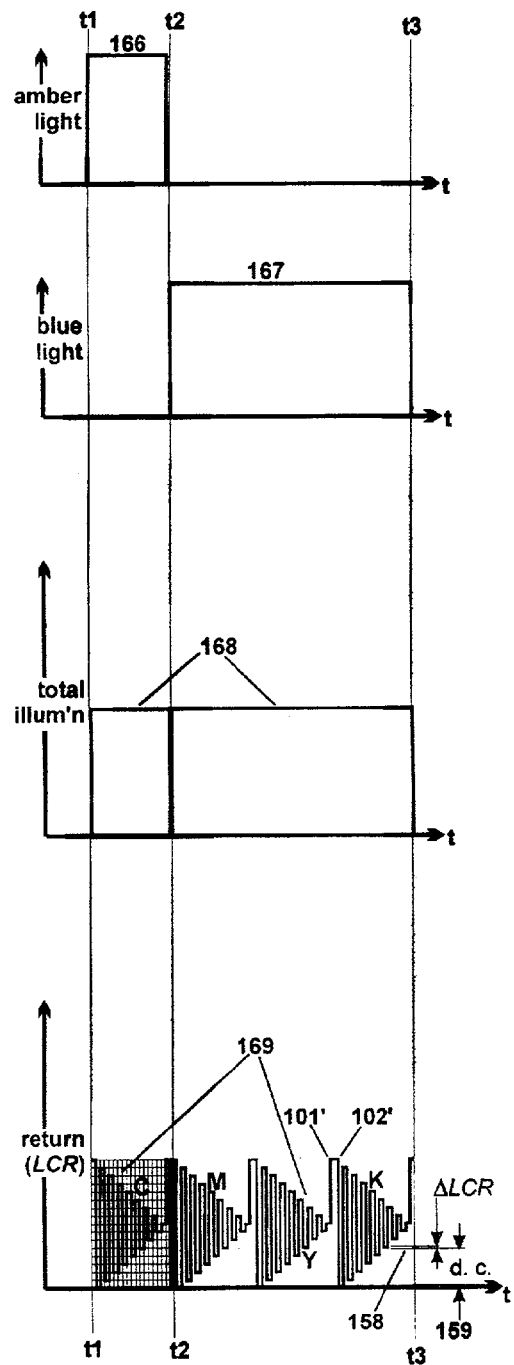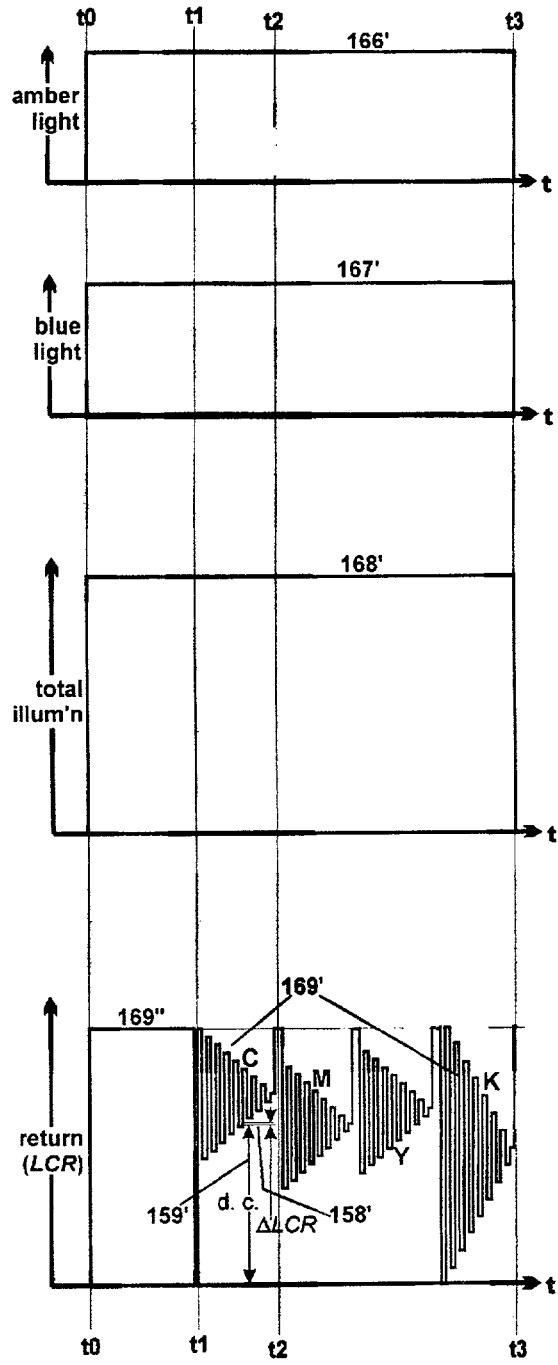

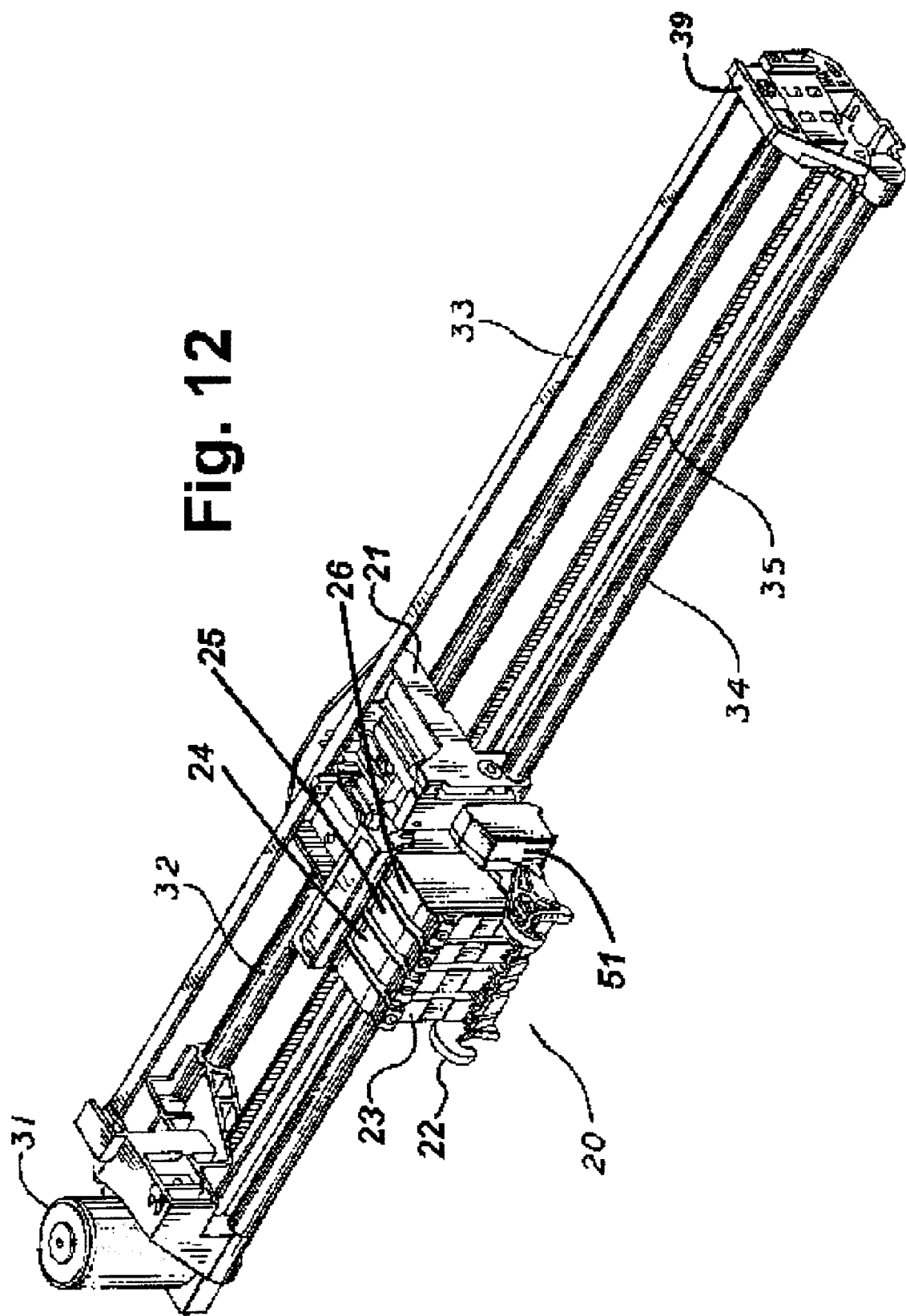

COMPENSATING FOR DRIFT AND SENSOR PROXIMITY IN A SCANNING SENSOR, IN COLOR CALIBRATING INCREMENTAL PRINTERS

RELATED PATENT DOCUMENTS

Related documents include other, coowned U.S. utility-patent documents hereby incorporated by reference in their entirety into this document. One is in the names of Francesc Subirada et al. and filed, very generally concurrently with the present document, and later assigned application Ser. No. 09/919,207. Another is in the names of Thomas Baker et al. and is application Ser. No. 09/183,819, later issued as U.S. Pat. No. 6,832,824. Yet another is in the name of Antoni Gil Miquel, Ser. No. 09/642,417.

FIELD OF THE INVENTION

This invention relates generally to inexpensive machines and procedures for incremental printing of text or graphics on printing media such as paper, transparency stock, or other glossy media; and more particularly to details of operating a scanning sensor for color calibration in such economical machines and procedures.

BACKGROUND OF THE INVENTION (a) Color calibration—Color reproduction is affected by printer variables, which can include different drop volumes of different pens, firing energies from the printer system itself, and kinds of media. Manufacturing tolerances, often quite broad—in the interest of economy—in these and other printer parameters result in a deviation between the actual and the targeted color.

To correct such deviations, it is known to include in a printer an automatic color-calibration algorithm, which can compensate for these differences. The idea is to calibrate the printer so that it acts as a nominal printer.

A representative approach to such corrections involves transfer functions (FIG. 1) preferably in the form of one-dimensional lookup tables (LUTs)—one transfer function for each channel (cyan C, magenta M, yellow Y and black K). Each transfer function is intended to perceptually linearize the response of the corresponding channel.

Preparing such transfer functions necessarily begins with some form of comparison between the actual output and the ideal output of a printer, in response to a known input. Such comparison in turn calls for printing a test pattern and then measuring it calorimetrically (or at least "pseudodensitometrically", as defined in the above-mentioned patent document of Thomas Baker)—in general a well-known procedure, with many variants.

Many incremental printers have a so-called "line sensor" that is mounted with the marking devices ("pens" in an inkjet machine) and typically provided for facilitating mechanical enhancements such as pen alignment. Line sensors have been found adequate for simple densitometric measurements and accordingly in many printers are now commonly put into service for color calibration as well. The Baker document includes extensive orientation to such sensors and their pseudodensitometric use, and related ways of alternatively obtaining more-precise measurements for calibration, e. g. through use of an onboard calorimeter.

(b) Linearity and stability—In all such efforts it is necessary to confront certain sources of measurement inaccuracy and imprecision. Virtually all equipment used for such measurements is subject to displacements of both measurement zero and range; and such measurement displacements must be carefully controlled to avoid collecting meaningless data. (Here the word "range" does not mean distance, but only means a tonal or colorimetric interval between zero and full-scale.)

Displacement of the measurement zero point is commonly and adequately managed by taking a reading without illumination. Range displacement most typically is more difficult to bring under control because it implicates the linearity and stability of every element—optical, electronic and mechanical—in the signal train.

Linearity is a requirement for sensitivity and accuracy (absolute correctness of what is measured). Stability is a requirement for precision (reproducibility)—and for accuracy too, as numbers can hardly be accurate if they are uncertain.

In particular the optical part of the signal path begins with illumination, i. e. the light source. This part of the path also extends, through the visual/mechanical properties of the printing medium, to the detector and the optoelectronic conversion which it performs.

The electronic part of the signal path begins with electronics that drive the light source, and picks up again where the detector hands off an analog electrical signal to (modernly) an analog-to-digital converter (ADC). Even though the illumination end of the train requires only a single stable level, drift in the source excitation or its electrooptical conversion efficiency is a severe limitation—but usually accommodated satisfactorily by allowing time for the source to warm up completely before measurements begin.

At the other end of the optical train, the detector and ADC too are subject to drifts but these are normally under control when the source drifts are. The detector and its ADC nevertheless have the far greater challenge of responding not just at a single level but linearly over the full possible range of the optical signals from the test pattern.

Linearity here is essential, since the whole point of the calibration—as mentioned above—is to develop a compensation for perceptual nonlinearity in the printing system. This requires that the detector and ADC be capable of sensitively discriminating and quantifying very small differences in signal level, and these small differences are necessarily measured superimposed upon some fairly substantial absolute level.

In other words, the measurement system must be able to quantify small differences between big numbers, and this ordinarily calls for high-quality, very sensitive and linear equipment. The computer-printer field, however, is extraordinarily price-competitive—and a detector and ADC of such quality are costly.

(c) Secondary standard—A known approach to mitigating the demands on these measurement elements is to provide a reference measurement at or near the full-scale level of the measuring system, so that at least the range itself is well defined. Thus it is commonly known to expose the detector to the printing medium, in a region that has no printing—i. e. that is bare printing medium—shortly before using the detector to make color measurements of a test pattern.

When this is done, the sensor system need not be itself a good absolute standard but only a secondary standard, since it is referred to the optical reference. Again, this approach mitigates, but does not eliminate, demands on the measurement elements.

This strategy still depends upon linearity in the detector and ADC. These devices are ordinarily adequate in linearity, provided that the d. c. level (the pedestal on which the small signal differences are superposed) is not excessively high; and provided also that the warmup period mentioned above is sufficient for good stability in the lamps, detector and ADC.

(d) Linearity and cost—In one concurrently developed system (not prior art), it has been found that these requirements can be met if the ADC is a relatively expensive unit. One key reason for this expense is that the d. c. signal pedestal is in fact quite elevated, placing stringent demands on sensitivity of the ADC, and this reason in turn arises— interestingly enough—directly from spectral requirements on the light source, as will now be explained.

In these systems it is necessary to use lamps that provide good illumination throughout the visible spectrum, since the inks in use necessarily span all those colors. Favored sources nowadays are light-emitting diodes (LEDs), and it is necessary to use two such devices to cover the visible colors. An LED, like most lamps, is notoriously temperature dependent in emission intensity, spectral distribution, and in some cases even spatial distribution of intensity across the beam.

In practice to achieve sufficient warmup for the needed stability, both LEDs must be turned on continuously throughout the measurement of the entire test pattern. Therefore even when the detector and ADC are measuring linearity for a particular ink that requires light from only one lamp, the other lamp is running too.

Thus the sensor and ADC are forced into use in an unfavorable mode: the small differences are as small as always, but the "large number" (the d. c. level) is generally doubled. Although this difficulty has been couched in terms of the LEDs currently favored, a similar unfavorable relationship would arise even for a single, spectrally continuous source.

As noted above, this relationship has been found acceptable if an adequately linear ADC is in use, but this condition requires a relatively costly ADC. In the concurrently developed system mentioned above, the ADC is a very sensitive twelve-bit unit. Such cost can be made acceptable in a high-end system, but in a more economical printer is very undesirable.

Thus the problem to be solved is how to provide signal linearity and sensitivity or "discrimination", adequate for a good color calibration—more economically. An inexpensive ADC would suffice if the required linearity were not so high—in particular, if the signal pedestal could be roughly halved—and this would be the case if the light level were lower.

Full spectral illumination with adequate warmup, however, call for a high light level as described above. Accordingly a solution to the stated problem heretofore has been elusive.

(e) Sensor proximity—Surprisingly, even the above-mentioned concurrently developed high-end system, notwithstanding its relatively higher cost, has been found to exhibit a peculiar kind of instability in the calibration process. In this system as already noted the ADC is quite sufficiently linear to enable full preliminary warmup of light sources and operation with optical signals that are superposed on a large pedestal as outlined in the preceding subsection.

Nevertheless, despite amply adequate sensor stability per se, accurate calibration has been found elusive in this system. Upon careful analysis, what at first seemed to be an entirely erratic measurement offset—varying during the course of the calibration measurements—was traced to a systematic variation with the tonal level being measured.

Although systematically related to tonal level, the variation was not proportional to the tonal level but nevertheless was correlated with particular tonal values. In due course it was discovered that the correlation actually was with position of the sensor-holding carriage along its scan path—and, finally, with variations ("runout") in the distance of the sensor from the printing medium, during the scanning motion.

In other words, the sensor-to-medium distance varies systematically along the scan axis. In retrospect this is not entirely surprising, since the scan path over the printing medium is nearly 1½ (five feet) long and the sensor runout quite tiny.

Nevertheless these minuscule displacements are more than sufficient to cause major fluctuations in light reflected from the printing medium to the detector. Particularly awkward is a distinct nonlinearity of these displacements, and of the resulting optical fluctuations, with position along the scan axis. What is called for is some means of compensating for this curious source of calibration error.

(f) Conclusion—As this discussion shows, limitations of linearity, stability and price in economical systems—and also of mechanical tolerances in even a relatively expensive system—continue to impede achievement of uniformly excellent color calibration and therefore inkjet printing. Thus important aspects of the technology used in the field of the invention are amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is a method of correcting for sensor drift, in color calibration for a printer. The method includes the step of printing on a printing medium a test pattern for each of at least one colorant.

It also includes scanning a sensor, along a scanning direction, over each test pattern and at least one adjoining tonal reference area of the medium. The phrase "tonal reference area" means an area which is visible to the sensor and for which a correct sensor response is known.

The printing step includes disposing each test pattern next to—along the scanning direction—the "at least one" reference area. Thereby the scanning step includes exposing the sensor to each respective reference area, along the scanning direction.

The method also includes the step of interpreting the sensor response to each reference area. The purpose of this interpreting is to adjust the sensor response to at least one part of each test pattern.

The foregoing may represent a description or definition of the first aspect or facet of the invention in its broadest or most general form. Even as couched in these broad terms, however, it can be seen that this facet of the invention importantly advances the art.

In particular, by scanning a tonal reference, together with the pattern—in the same scanning step—this aspect of the invention is able to make a real-time adjustment to the sensor response. The sensor response therefore can drift without impairing the accuracy of the color calibration.

Although the first major aspect of the invention thus significantly advances the art, nevertheless to optimize enjoyment of its benefits preferably the invention is practiced in conjunction with certain additional features or characteristics. In particular, preferably the printing step includes disposing each test pattern between (still along the scanning direction) at least two of the reference areas. If this first basic preference is observed, then another preference is that at least two of the reference areas be unprinted areas of the medium.

Another basic preference is that the at least one reference area be an unprinted area of the medium. In any event it is also preferred that the printing step include printing the test pattern for each of plural colorants. A more specific preference is that the printing step include printing the test pattern for each of plural colorants in succession.

Yet another basic preference is that the printing step include printing as each test pattern a sequence of color patches at various tonal levels—and that the interpreting step include applying the sensor unprinted-area responses to adjust the sensor response to substantially each color patch in at least one of the plural test patterns. In this case, it is further preferable that the applying step includes applying the sensor unprinted-area responses to adjust the sensor response to substantially each color patch in substantially all of the plural test patterns.

When the above-described applying step is performed, it also preferably includes interpolation between two sensor unprinted-area responses obtained at ends of each sequence of patches. In this case preferably the interpolation is based upon an interpolation model that is either an assumed mathematical function interrelating the responses at the ends of each sequence, with scan positions within each sequence; or a succession of levels separately measured for media-point responses during a preliminary precalibration scan.

When one of these interpolation models is used, then further preferably the preliminary precalibration scan is not made automatically in field operations but only at the factory. An alternative preference is that the preliminary precalibration scan be made automatically in field operations—but not applied in absolute terms, and that rather it be used only for proportioning the interpolation between the two responses obtained at the ends of each sequence of patches.

When the applying step includes adjusting the sensor response to substantially each color patch in substantially all the patterns—as described above—then preferably the printing step includes automatically arranging some of the patch sequences for each test pattern to fit an available size of the medium. For this purpose the sequences may be arranged either side-by-side or one above the other on the printing medium. Here the disposition of each sequence between two unprinted areas is maintained—and also the steps of exposing the two adjoining unprinted areas, and interpreting the two sensor unprinted-adjoining-area responses, are maintained—notwithstanding the automatic arranging. In this way the method is made robust to use of different printing-medium sizes.

When such automatic arranging is used, preferably the printing step includes printing the patches, within each sequence, in alternation between two extreme thitherto-unprinted tonal values of the sequence. In consequence, for each colorant—to provide a roughly constant printing activity during the printing step—highest and lowest tones appear side by side at one end of each sequence, and two closest-valued middle tones appear side by side at an opposite end of each sequence.

An alternative to the sequencing described in the preceding paragraph is that the printing step include printing the patches, within each sequence, in alternation between two most-nearly-central thitherto-unprinted tonal values of the sequence. The point is that, for each colorant, a roughly constant printing activity is provided during the printing step: two closest-valued middle tones appear side by side at an one end of each sequence, and highest and lowest tones appear side by side at an opposite end of each sequence.

Another basic preference is that the printing step include scanning at least one marking printhead along the scanning direction. This step forms the test pattern.

In preferred embodiments of its second major independent facet or aspect, the invention is an apparatus for printing an image hardcopy on a printing medium. This apparatus includes at least one printhead for marking on the medium, and a processor for controlling the at least one printhead to discharge inkdrops in a pattern to form the image.

Also included are some means for color-calibrating the at least one printhead. For purposes of breadth and generality in discussing the invention, these means will be called the "color-calibrating means" or simply the "calibrating means".

These calibrating means include several subelements, namely:

portions of the processor for operating the at least one printhead and the carriage to form a color-calibration test pattern, the test pattern being formed on the medium adjacent to at least one reference area, at least one light source for scanning across the test pattern and the at least one area to illuminate the pattern and the at least one area, a sensor for scanning across the pattern and at least one area, with the at least one source, to measure illuminated colors in the test pattern and the at least one area, and some means for interpreting measurement signals from the sensor, to correct the sensor output signals for drift due to incomplete warmup.

These last-mentioned means, again for generality and breadth, will be called the "interpreting means".

The interpreting means include processor portions for performing two functions: isolating measurement-signal segments representing the at least one area to establish a tonal-reference calibration level, and applying the calibration level to correct the measurement signals due to the measured illuminated colors.

The foregoing may represent a description or definition of the second aspect or facet of the invention in its broadest or most general form. Even as couched in these broad terms, however, it can be seen that this facet of the invention importantly advances the art.

In particular, even if the measurement signals are intrinsically unreliable due to either the light source or detector still warming up during the measurement, nevertheless the signals can be rendered fully reliable. This is achieved by the simple provision of reference area(s) and the interpreting means.

Although the second major aspect of the invention thus significantly advances the art, nevertheless to optimize enjoyment of its benefits preferably the invention is practiced in conjunction with certain additional features or characteristics. In particular, preferably the apparatus further includes a scanning carriage for carrying the at least one printhead across the medium to form the image. Here the processor includes components for coordinating the carriage and the at least one printhead to form the image.

Another basic preference is that the light source include a light-emitting diode. Yet another is that the interpreting means include an analog-to-digital converter (ADC) for receiving the measurement signals and deriving therefrom converter output signals representing the measurement signals; and portions of the processor for interpreting the converter output signals, to correct the converter output signals for drift due to incomplete warmup.

Still another basic preference is that each reference area be an unprinted area of the printing medium. In this way the tonal-reference calibration level is made a medium-point calibration level.

If the reference areas are unprinted areas, then preferably the at least one reference area includes plural unprinted areas of the printing medium; and the test pattern is formed on the medium between at least two of the plural unprinted areas. Another general preference is that the at least one printhead include plural printheads.

When an ADC is in service as mentioned above, the at least one reference area preferably includes plural such areas. The test pattern then is formed on the medium between at least two reference areas.

In preferred embodiments of its third major independent facet or aspect, the invention is in particular an economical apparatus. It is for printing an image hardcopy on a printing medium, and for obtaining near-colorimetric quality although the apparatus has inexpensive components. (As will be understood, the phrase "near-colormetric" may encompass reasonably accurate measurement results obtained through procedures such as the Baker document characterizes as "pseudodensitometric".)

The apparatus includes at least one printhead for marking on the medium. The at least one head is subject to marking tolerances that require color calibration: this is the first of several problems that characterize some of the elements of the invention.

Also included is at least one processor. The processor has portions for controlling the at least one printhead to discharge inkdrops in a pattern to form the image.

In addition the apparatus includes some means for color-calibrating the at least one printhead. As before these will be called the "color-calibrating means" or just "calibrating means".

These means include portions of the processor for operating the carriage and at least one printhead to form a color-calibration test pattern. The pattern is formed on the printing medium adjacent to at least one reference area (of the printing medium) that provides a tonal-reference calibration level.

The calibrating means also include plural light-emitting diodes for scanning across the test pattern and the at least one reference area to illuminate the pattern and the at least one area. Temperature dependence in the diodes leads to drift of illumination level during warmup: this is another of the several problems mentioned above.

In addition the color-calibrating means include a sensor for scanning across the pattern and at least one area. The at least one sensor is scanned together with the diodes, to measure illuminated colors in the test pattern and to measure the at least one reference area. As a result the illumination drift leads to drift of measurement signals from the sensor.

The calibrating means further include an ADC for receiving the measurement signals. Nonlinearities in this converter make measurements of small signal differences on a large signal pedestal undesirable. This fact sets the stage for yet another of the several problems: as a result of these nonlinearities, and the undesirability of having the small signal differences superposed on a large signal, the diodes are used in alternation rather than continuously—and therefore they never fully complete warmup. Because they never fully warm up, in turn they drift during each operating cycle.

The calibrating means also include some means for compensating for incomplete diode warmup. For the reasons noted earlier, these last-mentioned means will be called the "compensating means".

The compensating means include portions of the processor, used for interpreting output signals from the converter, to correct the converter output signals for drift due to the incomplete warmup. These interpreting portions in turn include processor portions for isolating converter-signal segments representing tonal-reference calibration level, and applying the tonal-reference calibration-level segments to correct the measurement signals due to the measured illuminated colors.

Thereby the apparatus accommodates the printhead tolerances and diode temperature dependence, and avoids the converter nonlinearities. In this way the invention itself resolves the several problems noted above.

The foregoing may represent a description or definition of the third aspect or facet of the invention in its broadest or most general form. Even as couched in these broad terms, however, it can be seen that this facet of the invention importantly advances the art.

In particular, the problems discussed arise from use of inexpensive components, but the invention resolves all those problems. Hence the invention enables achievement of superior performance by an inexpensive apparatus.

Although the third major aspect of the invention thus significantly advances the art, nevertheless to optimize enjoyment of its benefits preferably the invention is practiced in conjunction with certain additional features or characteristics. In particular, preferably the apparatus further includes a scanning carriage for carrying the at least one printhead across the medium to form the image.

In this case the at least one processor also has portions for coordinating the carriage and the at least one printhead to form the image. The processor controlling portions include portions for performing calculations used respectively in these functions:

color corrections to image data if desired,
rendition to exchange resolution for color depth,
ink depletion to avoid placement of excessive colorant on the printing medium, and
printmasking to allocate inkdrop discharge as between successive scans of the scanning carriage.

Another preference is that the processor operating portions include some means for printing the test pattern in each of plural colors respectively, and for each color as a sequence of color patches at various tonal levels; and that the processor interpreting portions include some means for applying the sensor reference-area measurements to adjust the sensor measurement for substantially each color patch in at least one of the plural test patterns.

When the provisions described in the preceding paragraph are present, it is also preferable that the applying means include some means for applying the sensor reference-area measurements to adjust the sensor measurement for substantially each color patch in substantially all of the plural test patterns. As before, these will be called the "applying means".

When such applying means are included, preferably they in turn include some means for interpolation between two sensor reference-area responses obtained at ends of each sequence of patches. In this case a still further preference is that the interpolation be based upon an interpolation model that is either an assumed mathematical function interrelating responses at ends of each sequence with scan positions within each sequence; or a succession of levels separately measured for media-point responses during a preliminary precalibration scan.

For this last-mentioned case there are several optional features, some of which also have been mentioned earlier. Preferably:

the preliminary precalibration scan is not made automatically in field operations—only at the factory;

the preliminary precalibration scan is made automatically in field operations but is not applied in absolute terms, and rather is used only for proportioning interpolation between two responses obtained at ends of each sequence of patches; and the processor operating portions include means for printing the patches, within each sequence, in alternation between two extreme thitherto-unprinted tonal values of the sequence—so that, for each color, to roughly stabilize the temperature of an associated printhead:

highest and lowest tones appear side by side at one end of each sequence, and two closest-valued middle tones appear side by side at an opposite end of each sequence; or the processor operating portions include means for printing the patches, within each sequence, in alternation between two most-nearly-central thitherto-unprinted tonal values of the sequence—so that, for each color, to roughly stabilize the temperature of an associated printhead:

two closest-valued middle tones appear side by side at an one end of each sequence, and highest and lowest tones appear side by side at an opposite end of each sequence.

In preferred embodiments of its fourth major independent facet or aspect, the invention is an apparatus for printing an image hardcopy on a printing medium. The apparatus includes at least one printhead for marking on the medium; and a processor for controlling the at least one printhead to discharge inkdrops in a pattern to form such image.

It also includes some means for color-calibrating the at least one printhead. These means (for breadth and generality called the "calibrating means") include portions of the processor for operating the at least one printhead to form a color-calibration test pattern on the medium.

The calibrating means also include at least one light source for scanning across the test pattern to illuminate the pattern at plural scan positions; and a sensor for scanning across the pattern, with the at least one source, to measure illuminated colors at the scan positions. Also included are guide means that establish a spacing between the printing medium and at least a portion of the sensor; the guide means are subject to tolerances that lead to nonuniformity of the spacing, at the scan positions.

Further included in the calibrating means are some means for interpreting measurement signals from the sensor. These interpreting means correct the sensor output signals for variation due to the spacing nonuniformity.

The interpreting means furthermore include processor portions for:

also scanning the sensor across an unprinted region of the medium to obtain respective unprinted-medium tonal-reference calibration levels for the scan positions, isolating measurement-signal segments representing the tonal-reference calibration levels for the scan positions, and applying the isolated signal segments to correct the measurement signals due to the measured illuminated colors.

The foregoing may represent a description or definition of the fourth aspect or facet of the invention in its broadest or most general form. Even as couched in these broad terms, however, it can be seen that this facet of the invention importantly advances the art.

In particular, this aspect of the invention resolves the problem of color-calibration error arising from tolerances in mechanical guideways and the like. This type of error, as previously suggested, afflicts even relatively expensive, highest-quality products—particularly on account of their extremely extended scan axis, which is provided to enable printing very large images.

Although the fourth major aspect of the invention thus significantly advances the art, nevertheless to optimize enjoyment of its benefits preferably the invention is practiced in conjunction with certain additional features or characteristics. In particular, preferably this facet of the invention is practiced in conjunction with those discussed previously, and also with the preferences mentioned for those earlier-discussed facets.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1 is a graph of representative finished calibration curves for four colorants;

FIG. 2 is a diagram showing a preferred test-pattern of four printed tonal ramps in the same four colorants, for use in or as part of preferred embodiments of the present invention;

FIG. 3 is a like diagram showing various possible automatically generated configurations of the FIG. 2 test-pattern ramps;

FIG. 5 is an elevational drawing, in longitudinal section, for a line sensor used in preferred embodiments of the invention;

FIG. 10 is a timing diagram representing signals in such hardware;

FIG. 11 is a like diagram but for a related printing system (not prior art) that is different from that of the drift-related forms of the invention (but related to the runout-related forms); and FIG. 12 is an isometric or perspective view of a scan mechanism that carries printheads across the printing medium in the FIG. 9 system—particularly showing guide and support bars associated with the sensor runout.

DETAILED DESCRIPTION OF THE PREFERRED EMBODIMENTS

1. Stability vs. Linearity vs. Cost

Figure 4:
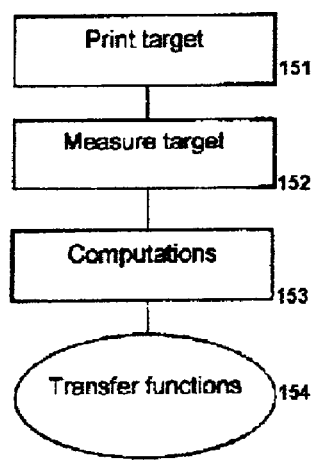
FIG. 4 is a flow chart showing relationships among primary, simplified steps of the preferred method.

As noted in the earlier "Background" section of this document, the problem left unsolved for relatively inexpensive printing systems was how to more economically provide signal linearity and discrimination that are adequate for a good color calibration. It is also observed there that an inexpensive ADC could be sufficient if a lower standard of linearity could be tolerated, and in turn that such a system would accomplish the goal if only the overall light level could be made half as high.

Halving the illumination level, however, seemed to fly in the face of a requirement for full spectral illumination, with ample warmup time. Illumination over the full spectrum cannot be achieved by running just one LED.

On the other hand, operating only one source at a time—i.e. alternating two LEDs, with adequate warmup in each ramp-measurement cycle—would take a prohibitively long time for all the lamp-warmup intervals. The invention, however, avoids the necessity to wait for lamp warmup.

Preferred embodiments of the invention as described in the above "Summary" section—by acquiring a reference measurement in intimate association with each set of test-pattern patches—introduce a new degree of freedom into the solution of the problem. Since this strategy provides measurement stability on a finer time scale than otherwise possible, overall stability can be made adequate even with higher drift of the sensor considered alone.

Consequently it is possible to dispense with extended warmup, and this in turn permits turning the LEDs on and off, rather than running both lamps continuously. Hence the invention enables reconciliation of the two ultimately required characteristics of an adequate measurement system—linearity and stability.

In particular this alternating-LED system permits entirely satisfactory operation using a less expensive ADC with considerably lower sensitivity. Whereas the previously mentioned concurrent system requires a twelve-bit ADC, application of the present invention allows use of an eight-bit device instead.

Turning to relatively more expensive, high-end systems it has also been noted in the "Background" section that a very small runout in sensor-to-print-medium distance generates a calibration defect. In fact, this calibration error ironically emulates some characteristics of the sensor instability that underlies the calibration problems in economical systems.

It has also been shown in the "Summary" section that this runout-related calibration error can be attacked by the same tactics used against sensor instability as such. Thus the present invention comes into play in a salutary manner for both kinds of product.

2. Calibration Target

In short, the desired linearity and stability are attainable in combination—merely through a simple but elegant geometrical provision in the test pattern and the mode in which it is scanned. Such a configuration of the test pattern (FIG. 2) include primary CMYK ramps 103–106, and marks 131, 132 for positioning the sensor and warming up the pens.

The ramps 103–106 and warmup marks 131, 132 may be arrayed in stacked rows as shown. The illustrated test pattern has sixteen patches in each color—with a column 111 for the first tonal-value patches in all colors CMYK, then an adjacent column 112 for the second tonal-value patches, and so forth through the rest of the columns 113, 114 ... 125, 126. (To avoid cluttering this illustration, the column callout numbers have been omitted between 114 and 125.)

The ramps, however, as shown in the illustration are preferably not inked in customary ascending or descending tonal order. Rather, in the interest of holding printhead temperatures relatively uniform during the test-pattern printing, the tonal values are placed in an alternating sequence of converging (or diverging) high and low values.

If there were only four patches, for example, an acceptable converging sequence could be: 100%, 25%, 75%, 50%—so that each adjacent tone-value pair would total to a common sum (125%, for the simplified example). As another example, for six patches a diverging sequence could be: 50%, 66⅔%, 33⅓%, 83⅓%, 16⅔%, 100%—producing a common sum of 116⅔%.

As will be understood, the tonal values need not be stepped equally. Depending on the inks, media, and types of image that are of greatest interest, the steps may be selected to particularly accentuate midtones, or highlights, or shadows—as preferred.

Actual tonal levels for the sixteen color-patch columns 111-126 illustrated—if it is chosen to use equal tonal steps—are (in percentages): 100, 6¼, 93¾, 12½, 87½, 18¾, 81¼, 25, 75, 31¼, 68¾, 37½, 62½, 43¾, 56¼, 50. The corresponding alternation in sensor responses (FIG. 6) for the corresponding sixteen measurement plateaus 111'–126' is evident.

In addition to the color patches, the test pattern also includes tonal-reference areas 101, 102, preferably in the form of white (or, more precisely, unprinted) areas or "space patches" of the print medium. These reference areas are employed to, in effect, adjust a full-scale value of the measurement system.

Although the ideal tonal value for the tonal-reference areas 101, 102 may be zero (blank printing medium), it is permissible to print a well-defined nonzero tone in these areas. Such a tone might for example be a light gray printed with black ink, or might even be a chromatic light color.

The illustration shows the target description parameters in a target of four colors, one color per row and sixteen patches per color. All of these parameters, however, are subject to definition at the system designer's preference:

width 109, 129 of each warmup mark,
width 127 of each space patch,
width 128 of each color patch,
height 108 of the patches and marks,
spacing 107 between rows of patches,
number (most typically from one to four) of colors per row,
number (typically from three to six) of colors,
number (most typically from eight to twenty-four) of patches per color,
list of patches for each color, with the ink density of each patch, and
ink density (most typically 40% to 60%) of the mark patch.

As will be understood, the warmup marks 131, 132 need not have the same dimensions as the color patches 103–106. Similarly, not all the color patch dimensions 128, 108, row spacings 107 etc. need be common to the various colors or tonal values.

In the preferred system, the printer automatically detects the size of the printing medium and forms the layout that best fits on it. In this way, both scanning time and consumption of printing media are minimized.

Based on this technique, given a sixteen-patch, four-color system, it is possible to use any one of four configurations. Thus the system may employ:
- a layout 133 (FIG. 3) with all the ramps 106–103 in a single row, or
- a layout 134 with the first three ramps 106–104 in one row and the remaining ramp 103 in a separate row, or
- a layout 135 with two ramps 106, 105 in a first row and the remaining two ramps 104, 103 in a second, or
- a layout 136 (e. g. like FIG. 2) with each ramp in a separate row. Each of these configurations offers the linearity, stability and economy benefits of the invention.

3. Procedure

In operation, a target is printed 151 (FIG. 4) using one of these configurations and then is scanned 152 using the line sensor (FIG. 5) provided in the printer. Densitometric or pseudodensitometric measures are then obtained from the line-sensor readings, and from those the necessary corrections for calibration are derived 153 and applied 154.

In preferred embodiments of the invention, the line sensor is a measuring device, contained within a protective enclosure 141 (FIG. 5). The sensor includes two lamps—one blue LED 143 and one amber LED 144—and one photodiode 145 that serves as the detector. For highest signal-to-noise ratio, the cyan ramp 103 is measured with the amber LED 144 and other colors with the blue LED 143.

The device preferably includes an air-cooled lens 146, and an infrared filter 147 that also serves as an aerosol shield. The assembly is typically carried with the pens, on a pen carriage, and disposed to illuminate and read the printing medium 142 (such as paper, or a plastic web, or glossy or coated stock, all as very well known in the art). The print medium 142 is usually supported by a platen 148.

Before starting the scan, the line sensor itself is calibrated to maximize the signal range and further stabilize the measurement. That sensor calibration should not be confused with the overall color calibration which is the subject of the present invention.

One suitable sensor-calibration paradigm is described in the above-mentioned Subirada patent document. The principles asserted in that document, however, need not be followed in practicing the present invention.

4. Triggering Events

In order to obtain best color reproduction, the color-calibration algorithm should be performed whenever the printer varies. Such variation can be, for example, a change in pens, printing medium, or humidity. The user of the printer system can trigger the calibration manually whenever desired.

The greatest single contribution to color-calibration shift is produced by changing pens. When this occurs, in the preferred embodiment, automatically the system asks the user to perform the calibration—which, if the user complies, consumes a quantity of printing medium, ink and time.

If the user decides in favor of this recommended recalibration, the new calibration values will be used until the next trigger event—i.e. pen change, manual calibration or calibration reset. If the user decides against recalibrating, default factory values are used instead.

5. Measurement

Figure 6:
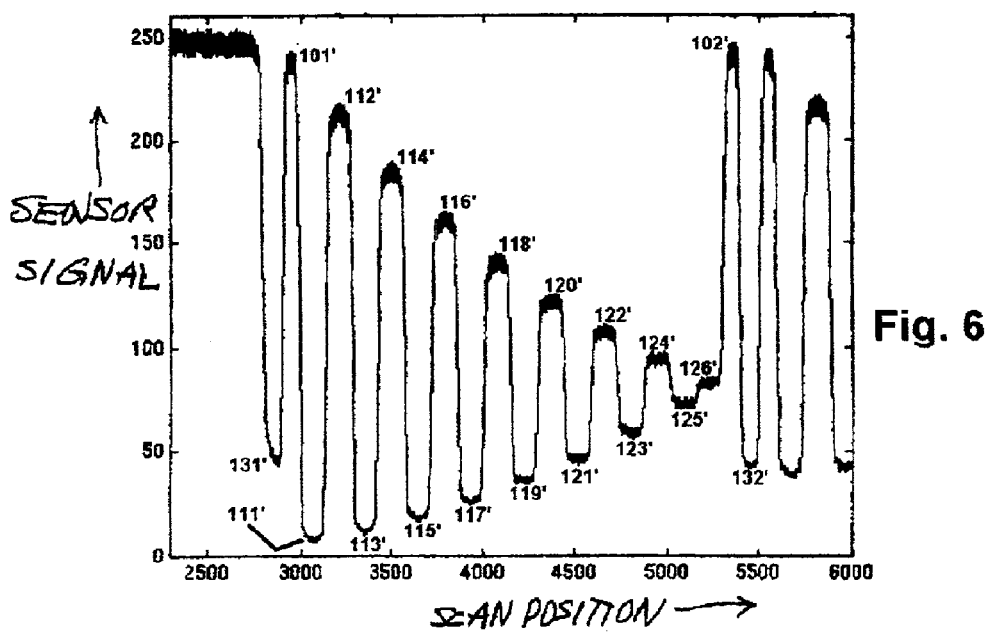
FIG. 6 is a reproduction of an automatically generated graph of signal strengths corresponding to measured light intensities reflected from certain successive features of the FIG. 2 test pattern.

The target (test pattern) is scanned with the line sensor (or if preferred a true calorimeter as taught by Baker), to acquire raw signal values 101', 102', 131', 132', 111'–126' (FIG. 6). In the illustration the abscissa represents position along the carriage scan axis; and the series of alternating high and low plateaus appearing in the chart are signal values obtained at successive positions along that axis.

Close examination of the recorded waveform reveals considerable noise in the signal at its plateaus, particularly at higher signal levels where noise is intrinsically higher. Also the inexpensive electronic components selected are particularly susceptible to short-term jitter as well as the drifts discussed previously.

Light reflected from each patch 111–126 or tonal reference area 101, 102 of the test pattern is recorded at a corresponding one of the short, roughly horizontal plateaus 111'–126', 101', 102' appearing in the chart. (The reference number used for each plateau is the same as the number for its respective patch or reference area, but with the addition of a so-called "prime" symbol—i.e. tick mark.)

In view of the noisiness just mentioned, averaging within each plateau is needed. From a 24 dot/mm (600 dpi) scan, roughly sixty samples (definable) of ADC output from each plateau are averaged to obtain the measurement of the respective patch. The present inventors call these data the "absolute calorimetric ratio" or ACR, and with n representing the number of samples (e.g. as just indicated n≅60):

$$ACR = \frac{1}{n}\sum_{x=1}^{n} v(x),$$

where v(x) is the output voltage of the sensor.

To make the system less sensitive to line-sensor variations (aging, aerosol contamination, different batches and so forth), the measurement range is rescaled between the print-medium sample (nominally white) and the darkest patch (one hundred percent ink). These rescaled data are called the "local contrast ratio" or LCR:

$$LCR(i) = \frac{ACR(i) - ACR_{100\%}}{ACR_{0\%} - ACR_{100\%}}$$

where i identifies a set of n values ACR, $ACR_{0\%}$ is the printing—medium measurement, and $ACR_{100\%}$ is the measurement with 100% ink.

The converging profile of high and low plateaus that is conspicuous in the illustration corresponds to the alternating high and low tonal values of the patches (FIGS. 2 and 3). As mentioned previously, the test patches are printed in this way to roughly stabilize the amount of printing done per unit time—and therefore the extent of heating to which the pens are subjected—during the course of the measurement.

Each set "i" of n values ACR(i) is very closely associated, as a group of values all taken at just a particular one of the high or low plateaus—and thus very closely grouped together along the carriage-scan axis. Accordingly the index i can be regarded as a counter roughly representing position along that scanning axis.

In this preliminary conceptual formulation, only one printing-medium measurement $ACR_{0\%}$ comes into the LCR expression above. Here a single print-medium sample is used for all patches, placing a sometimes unrealistic demand upon accuracy of that single print-medium return. As will next be seen, this approach is often inadequate or only marginally adequate.

6. Residual Sensor Drift, and Compensation

Although in the economical products discussed earlier the LEDs have been warmed up briefly to stabilize the illumination and the detector readings, typically some variability (FIGS. 7 and 8) still appears within a scan. The charts illustrated are reproductions of 50 cm (20 inch) scans of raw medium—i.e. unprinted print-medium surface. (In other words, these sets of readings do not show reflectance from any printed color ramp or patch.)

Figure 7:
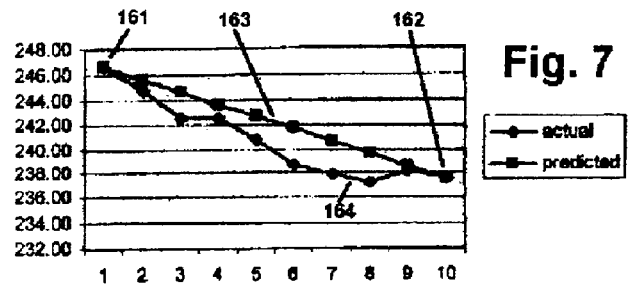
FIG. 7 is a like graph of light intensities reflected from an unprinted area of printing medium, as a function of time.
Figure 8:
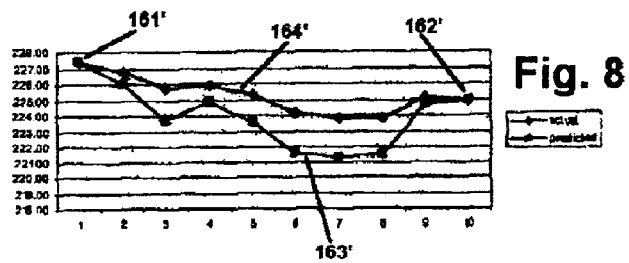
FIG. 8 is a graph similar to FIG. 7 but made under different measurement conditions.

For FIG. 7, the measurement 161 at the start (left end) is roughly eight or nine counts (three percent) higher than that 162 at the conclusion (right end). To compensate for such drifts this return 101', 102' (FIG. 6) from the medium 101, 102—at least at one end of the scan region, preferably at both—is measured, as part of the calibration scans, concurrently with the measurement of optical returns 111'–126' from the patches 111–126.

Sensor drift can be predicted 163, 163' (FIGS. 7 and 8) with less than one-percent error relative to actual drift 164, 164'—that is to say, much more accurately than just assuming that the response is stable. Such prediction enables treatment of the above-mentioned printing-medium measurement $ACR_{0\%}$ as a function of position along the carriage scan axis—so that the notation can be changed to $ACR_{0\%}(i)$, explicitly identifying the absolute contrast ratio by the position-counter index i mentioned earlier.

Once the print-medium brightness is thus expressed as a function of scan position, it follows that—in finding normalized LCR values as introduced above—each printed color patch $ACR(i)$ can be more-precisely normalized to a respective printing-medium measurement $ACR_{0\%}(i)$, rather than to a single universal value applied over the entire scan:

$$LCR(i) = \frac{ACR(i) - ACR_{100\%}}{ACR_{0\%}(i) - ACR_{100\%}}.$$

Now it must be asked how to find the $ACR_{0\%}(i)$ values for use here in the denominator.

Given the starting position 161 (FIG. 7) and knowing a representative overall sensor drift to the final position 162, found from a large number of overall drift assessments, a full series 163 of estimated print-medium brightnesses $ACR_{0\%}(i)$ can be generated by simple linear interpolation. In practice this straightforward expedient has been found satisfactory; however, other methods can be used instead.

For example, still within the tactic of mathematical interpolation, another interpolation function—e.g. exponential rather than linear—can be assumed. In some cases such a function may be found to correspond to the actual drift behavior much more accurately than a linear function.

A still more accurate approach is to actually measure a representative relationship among sensed returns 163' (FIG. 8) from the printing medium, at carriage-scan positions corresponding to the intermediate patch positions i—that is, between the starting and ending positions 161', 162', rather than at those two positions alone. Such a measured relationship then serves as an ad hoc interpolation "function" for use in finding the series $ACR_{0\%}(i)$ of print-medium brightnesses.

For this purpose, an extra scan (not shown) can be used to actually measure the print medium at the exact points along the scan axis where the patches appear—but not, of course, at the identical two-dimensional locations where and times when the patches are present. For example, such an extra measurement scan can be performed before the test-pattern patches are printed, or can be performed at a height along the print-medium advance axis that is above or below the patches. The extra scan is valuable in finding a time-variation profile of short-term relative drift, within a measurement period, that is likely to be somewhat reproducible.

Even if this is done, however, because of ongoing long-term drift that changes the absolute level of the whole profile it is not fully a substitute for printing and measuring the reference areas at the end or ends of the color ramps—to obtain a good correlation between the color scan and the print-medium scan. Use of the real-time returns from both ends 101, 102 (FIG. 6) of the test pattern is more definitive of the absolute level.

On the other hand, as stated above, in fact a sensor relative drift profile within a scan, such as illustrated (FIGS. 7 and 8), is moderately reproducible. Accordingly calibration based on measuring even just one end (e.g. just the starting level 101)—and then thereafter pegging or anchoring the measured drift profile to the value 101', 161/161' measured there—is usually a good approximation to the calibration based on measuring at both ends 101, 102.

The purpose of anchoring the profile, as just mentioned, is to ensure the correct absolute tonal level. In economical products, once again, error in absolute level is the greater component of the calibration errors that the invention aims to solve—whereas the time-variation profile may usually be considered in essence a refinement. (The contrary will generally be found true in runout-related problems of the higher-end systems.)

For any newly designed system, it is advisable to verify the adequacy of this approximation. In the most highly preferred embodiment, in view of the uncertainty that is associated with shifts in operating characteristics during the course of a printer model-line production run, measurement is made at both ends.

In practice of this invention, the distinctions between what is "measured", what is "predicted" and what is "actual" may be confusing. The curve of values 163' physically measured at the carriage-scan-axis positions of the color patches—but measured at very different heights, along the media-advance axis, from those color patches—is labeled "predicted" because it represents numbers that will be used for predicting future print-medium tonal values at the two-dimensional positions (i.e. coordinates) of the color patches.

The curve of values 164' derived from those "predicted" values is labeled "actual" because it represents numbers that are believed to be true underlying tones of bare printing medium, at those two-dimensional positions of the patches. Since the patches by definition occupy those positions during measurement scans, no real-time direct measurement of the "actual" values is physically possible.

Referring again to the above expression for LCR: not only the bare-print-medium returns $ACR_{0\%}(i)$ but also the full-inking returns $ACR_{100\%}(i)$ could be estimated as well. Their influence, however, is much smaller, both because of the equation form and because of the lower physical variation (less light is reflected in a 100% patch).

Sensor-drift compensation is performed on a per-color basis. Hence it is immaterial whether the test patterns are printed each on its own individual line or strung out in groups of two or more on a line.

In the most highly preferred embodiment, the patches are printed with equal tonal spacing—i.e. in colorimetrically uniform steps. Other tonal spacings in the ramp, however, can be used to equivalent effect.

7. Runout-induced Calibration Error, and Compensation

Although the presentation in the preceding subsections has been introduced in terms of sensor instability as a root cause, it can now be appreciated that virtually identical observable anomalies are generated when sensor proximity to the printing medium varies along the scan path. Specifically, even when the light sources and detector in the sensor are stable—and even when the following electronic components are linear—the simple variation of distance from source to print medium, and back to detector, causes a corresponding variation of calibration signal.

Accordingly the same analysis applies to compensating for this variation through measurement of the bare, unprinted medium at positions across the scan axis—and application of the resulting offsets to the respective raw data points at like positions. In particular, however, since runout may be most typically worst in central regions along the carriage track than at one end or the other, here the use of linear interpolation 163 (FIG. 7) is less likely to be adequate.

Instead the use of actually measured relationships 163' (FIG. 8) among the measured points is the solution most typically favored for this cause of calibration anomalies. In this case it is the particular profile of those relationships that carries the crux of the improvement. Since the sensor itself is amply stable, the previously mentioned anchoring of the profile (to obtain the correct photometric level) usually is unnecessary.

8. Hardware and Program Implementation

As the invention is amenable to implementation in, or as, any one of a very great number of different printer models of many different manufacturers, little purpose would be served by illustrating a representative such printer. If of interest, however, such a printer and some of its prominent operating subsystems can be seen illustrated in several other patent documents of the assignee, Hewlett Packard—such as for example the previously mentioned document of Thomas Baker or that of Antoni Gil Miquel, which both particularly illustrate a large-format printer-plotter model.

In some such representative printers, a cylindrical platen 241 (FIG. 9)—driven by a motor 242, worm and worm gear (not shown) under control of signals from a digital electronic processor 71—rotates to drive sheets or lengths of printing medium 4A in a medium-advance direction. Print medium 4A is thereby drawn out of a supply of the medium and past the marking components that will now be described.

A pen-holding carriage assembly 220 carries several pens, as illustrated, back and forth across the printing medium, along a scanning track—perpendicular to the medium-advance direction—while the pens eject ink. For simplicity's sake, only four pens are illustrated; however, as is well known a printer may have six pens or more, to hold different colors—or different dilutions of the same colors as in the more-familiar four pens. The medium 4A thus receives inkdrops for formation of a desired image.

A very finely graduated encoder strip 233, 236 is extended taut along the scanning path of the carriage assembly 220 and read by a very small automatic optoelectronic sensor 237 to provide position and speed information 237B for one or more microprocessors 71 that control the operations of the printer. One advantageous location 35 (FIG. 12) for the encoder strip is immediately behind the pens.

A currently preferred position for the encoder strip 233, 236 (FIG. 9), however, is near the rear of the pen carriage—remote from the space into which a user's hands are inserted for servicing of the pen refill cartridges. For either position, the sensor 237 is disposed with its optical beam passing through orifices or transparent portions of a scale formed in the strip.

The pen-carriage assembly 220, 220' is driven in reciprocation by a motor 231—along dual support and guide rails (not shown)—through the intermediary of a drive belt 235. The motor 231 is under the control of signals 231A from the processor or processors 71.

Preferably the system includes at least four pens holding ink of, respectively, at least four different colors. Most typically the inks include yellow y, then cyan C, magenta M and black K—in that order from left to right as seen by the operator. As a practical matter, chromatic-color and black pens may be in a single printer, either in a common carriage or plural carriages.

Figure 9:
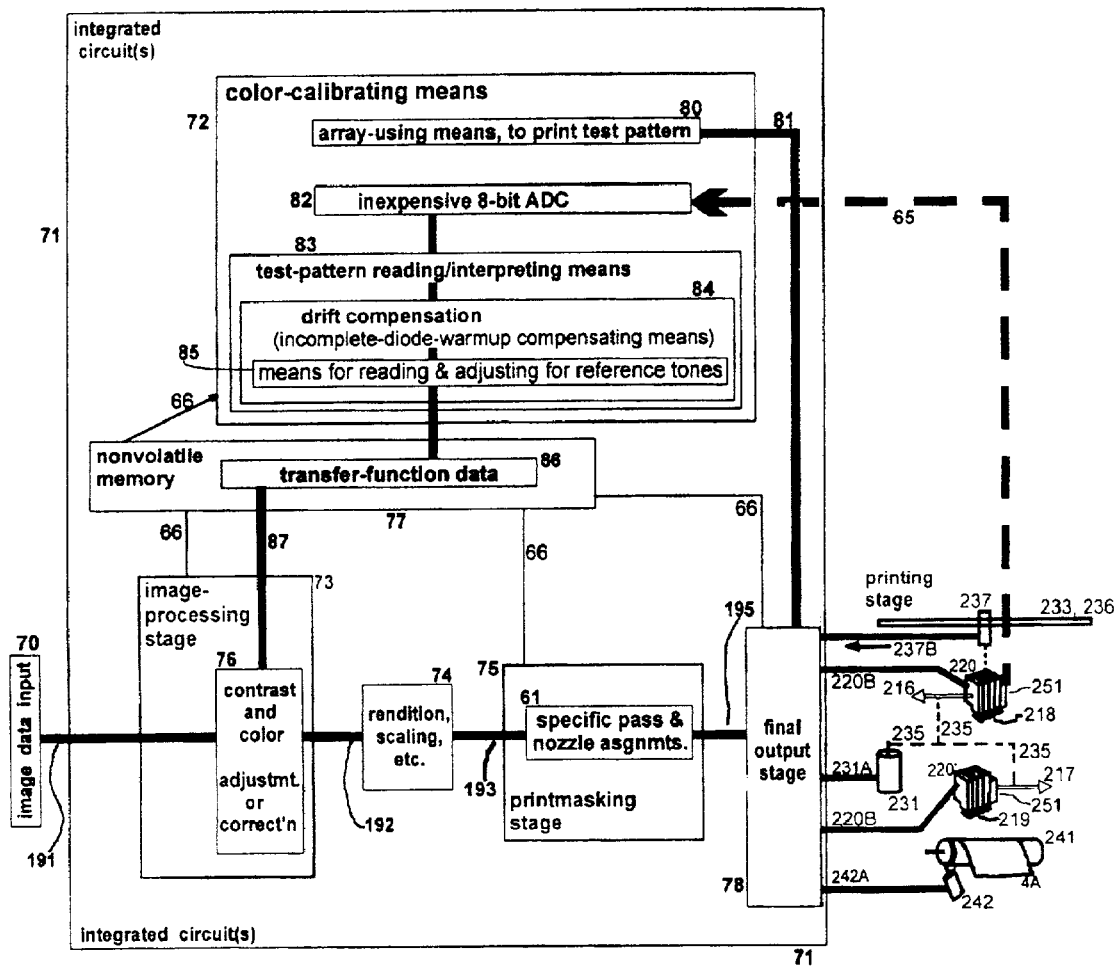
FIG. 9 is a block diagram, highly schematic, representing hardware (including programmed circuitry) in a preferred embodiment of the invention.

Also included in the pen-carriage assembly 220, 220' is a tray carrying various electronics. FIG. 9 most specifically represents a system such as the Hewlett Packard printer/plotter model "DesignJet 2000CP", which does not include the present invention. These drawings, however, ever, also illustrate certain embodiments of the invention, and—with certain detailed differences mentioned below—a printer/plotter that includes preferred embodiments of the invention.

The output-printing stage discussed above with respect to the FIG. 9 block diagram includes carriage guide and support bars 32, 34 (FIG. 12), as well as end bracket 39. It is primarily a tiny nonlinearity in the bars 32, 34 that is responsible for the previously noted sensor-to-print-medium runout problems in one product.

In that product, however, the bars are actually much longer, in proportion to other relevant system dimensions, than suggested in FIG. 12. Accordingly the sensor limitations discussed earlier occur notwithstanding that the carriage runout as such is held to an extremely fine tolerance.

Before further discussion of details in the block diagrammatic showing of FIG. 9, a general orientation to that drawing may be helpful. This diagram particularly represents preferred embodiments of one previously discussed apparatus aspect of the invention.

Conventional portions of the apparatus appear as the printing stage 220 through 251, and 4A, discussed above, and also the final output-electronics stage 78 which drives that printing stage. This final-output stage 78 in turn is driven by a printmasking stage 75, which allocates printing of ink marks 218, 219 as among plural passes of the carriage 220, 220' and pens across the medium 4A.

Also generally conventional are a nonvolatile memory 77, which supplies operating instructions 66 (many of which are novel and implement the present invention) for all the programmed elements; an image-processing stage 73, rendition-and-scaling module 74; and color input data 70 seen at far left in the diagram. The data flow as input signals 191 into the processor 71.

Features particularly related to the apparatus aspect of the invention appear in the upper and upper-central region of the diagram as element 72, and elements 80 through 87; these will be detailed below. Given the statements of function and the diagrams presented in this document, a programmer of ordinary skill—if experienced in this field—can prepare suitable programs for operating all the circuits.

The novel features appear primarily in the color-calibrating means 72—which include the test-pattern-generating circuitry 80, 81, as well as a data path 65 for information that results from reading of the test patterns by another small optical sensor 251 that also rides on the carriage. This sensor is the device detailed in FIG. 5 and already discussed.

Still within the processor 71 and its calibrating unit 72, such sensor data 65 pass via the previously mentioned inexpensive ADC 82 to a module 83 that reads and interprets the data. In particular the interpretation includes operation of a drift-compensation subunit 84.

It is here that the invention provides portions 85 of the processor circuitry that read and adjust for the reference tones 101, 102 (FIG. 2). Test-pattern data received from the path 65 and read by the interpreting means 83 are used in derivation 82 of the transfer-function data 87 already described.

One or more of various forms 87 of the transfer-function information—whether in the form of coefficients for use in a formula, or in the form of a lookup table—are then stored in a particular dedicated portion 86 of the previously mentioned nonvolatile memory 77. The transfer-function information is retrieved from that memory bank 86 whenever needed to guide the operation of the color-adjustment module 76 in preparing the input data 70 for later transformations 74, 75, 78 and thereby for eventual printing in the printing stage.

The pen-carriage assembly is represented separately at 220 when traveling to the left 216 while discharging ink 218, and at 220' when traveling to the right 217 while discharging ink 219. It will be understood that both 220 and 220' represent the same pen carriage, with the same pens.

The previously mentioned digital processor 71 provides control signals 220B, 220'B to fire the pens with correct timing, coordinated with platen drive control signals 242A to the platen motor 242, and carriage drive control signals 231A to the carriage drive motor 231. The processor 71 develops these carriage drive signals 231A based partly upon information about the carriage speed and position derived from the encoder signals 237B provided by the encoder 237.

(In the block diagram all illustrated signals are flowing from left to right except the information 237B, 65 fed back from the sensors 237, 251—as indicated by the associated leftward arrows—and analogously the previously mentioned information 66 where shown passing to the calibrating means 72, in a nonstandard direction.) The codestrip 233, 236 thus enables formation of color ink-drops at ultrahigh precision during scanning of the carriage assembly 220 in each direction—i.e., either left to right (forward 220') or right to left (back 220).

The invention is not limited to operation in four-colorant systems. To the contrary, for example six-colorant "CMYKcm" systems including dilute cyan "c" and magenta "m" colorant are included in preferred embodiments.

The integrated circuits 71 may be distributive—being partly in the printer, partly in an associated computer, and partly in a separately packaged raster image processor. Alternatively the circuits may be primarily or wholly in just one or two of such devices.

These circuits also may comprise a general-purpose processor (e.g. the central processor of a general-purpose computer) operating software such as may be held for instance in a computer hard drive, or operating firmware (e.g. held in a ROM 77 and for distribution 66 to other components), or both; and may comprise application-specific integrated circuitry. Combinations of these may be used instead.

9. Adequate Linearity with Inexpensive Converter

The reason that an inexpensive eight-bit ADC 82 can provide sufficient sensitivity and linearity for good color calibration is that the signal pedestal—or typical d. c. offset—158 (FIG. 10) in the present invention is roughly half of the analogous pedestal or offset 158' in the previously mentioned high-end system that originally was concurrently developed without the present invention. Therefore the ADC range can be scaled to just half the signal range.

Generally speaking the small differences ΔLCR in plateau signals are the same size in either system. (These tiny but critical differences ΔLCR are not the steps between tonal values in the ramp, but rather are the uncontrolled variations in these steps. These small tone intervals basically represent the pen tolerances, temperature fluctuations, and ADC sensitivity or sensitivity limitations discussed earlier.)

Halving the overall signal range therefore doubles the implication of these variances to be measured. That is, it doubles the number of ADC bits corresponding to a typical variance.

It remains to be seen why the invention induces the low signal pedestal 158. In the concurrently developed system, both the amber LED illumination 166' (FIG. 11) and blue LED illumination 167' are always on.

Both lamps are on starting from the beginning t0 of the warmup time and proceeding through the start t1 of the cyan scan interval—and the start t2 of the remaining three scan intervals—to the conclusion t3 of the test. In that system the total illumination 168' is therefore roughly twice that from each LED considered alone.

This is not so for the drift-correcting forms of the present invention, in which the amber illumination 166 and blue illumination 167 are present sequentially rather than together. The total illumination 168 is therefore substantially the same as that from each LED considered alone.

For tutorial purposes the reflectance behavior of the various patches will be stated here in a very highly simplified way, and the drawings too are very simplified. The resulting conclusions remain generally instructive, although the numerical details are only very rough.

During measurement of the cyan patch (t1 through t2), very roughly all the illumination from the blue LED is constantly reflected from that patch—and the signal variations ΔLCR of interest (as well as the entire structure of signal steps) occur mainly in the reflection from the amber LED. Hence in this interval the return 169' consists of the alternating opposed-sawtooth shape seen earlier, but deducted from the double-height total illumination 168'.

The drawing clearly shows the result: representative variations ΔLCR of interest are raised above the zero signal level by the height of the roughly unattenuated blue illumination. During measurement of the first two other patches (from t2 two-third of the way to t3), somewhat converse relationships obtain: major fractions of all the amber LED output reflect constantly from the yellow and magenta patches.

Therefore the signal varies mainly in the reflection from the blue LED—once again raising representative variances above the zero, by the height of the relatively less-attenuated amber illumination. (The black measurement is differently affected, as shown.)

The above disclosure is intended as merely exemplary, and not to limit the scope of the invention—which is to be determined by reference to the appended claims.

What is claimed is:

1. A method of correcting for sensor drift, in color calibration for a printer; said method comprising the steps of:

printing on a printing medium a test pattern for each of at least one colorant;

scanning a sensor, along a scanning direction, over each test pattern and at least one adjoining tonal reference area of the medium;

wherein the printing step comprises disposing each said test pattern next to, along the scanning direction, the at least one reference area;

whereby said scanning step comprises the step of exposing the sensor to each respective reference area, along the scanning direction; and interpreting the sensor response to each said reference area, to adjust the sensor response to at least one part of each test pattern.

2. The method of claim 1, wherein:
the printing step comprises disposing each said test pattern between, along the scanning direction, at least two of said reference areas.

3. The method of claim 2, wherein:
at least two of said reference areas are unprinted areas of the medium.

4. The method of claim 1, wherein:
the at least one reference area is an unprinted area of the medium.

5. The method of claim 4, wherein:
the printing step comprises printing said test pattern for each of plural colorants.

6. The method of claim 3, wherein:
the printing step comprises printing said test pattern for each of plural colorants.

7. The method of claim 2, wherein:
the printing step comprises printing said test pattern for each of plural colorants.

8. The method of claim 1, wherein:
the printing step comprises printing said test pattern for each of plural colorants.

9. The method of claim 1, wherein:
printing step comprises printing said test pattern for each of plural colorants in succession.

10. The method of claim 1, wherein:
the printing step comprises printing as each test pattern a sequence of color patches at various tonal levels; and
the interpreting step comprises applying the sensor unprinted-area responses to adjust the sensor response to substantially each color patch in at least one of the plural test patterns.

11. The method of claim 10, wherein:
the applying step comprises applying the sensor unprinted-area responses to adjust the sensor response to substantially each color patch in substantially all of the plural test patterns.

12. The method of claim 11, wherein:
the applying step comprises interpolation between two sensor unprinted-area responses obtained at ends of each sequence of patches.

13. The method of claim 11, wherein the interpolation is based upon an interpolation model selected from the group consisting of:
an assumed mathematical function interrelating the responses at the ends of each sequence, with scan positions within each sequence; and
a succession of levels separately measured for media-point responses during a preliminary precalibration scan.

14. The method of claim 13, wherein:
the preliminary precalibration scan is not made automatically in field operations but only at the factory.

15. The method of claim 13, wherein:
the preliminary precalibration scan is made automatically in field operations but is not applied in absolute terms, and rather is used only for proportioning the interpolation between the two responses obtained at the ends of each sequence of patches.

16. The method of claim 11, wherein:
the printing step comprises automatically arranging some of the patch sequences for each test pattern, selectively either side-by-side or one above the other on such printing medium so as to fit an available size of such medium;

said disposition of each sequence between two unprinted areas is maintained notwithstanding said automatic selective arranging; and said steps of exposing said two adjoining unprinted areas, and interpreting said two sensor unprinted-adjoining-area responses, are maintained notwithstanding said automatic selective arranging;

whereby the method is robust to use of different printing-medium sizes.

17. The method of claim 16, wherein:
the printing step comprises printing the patches, within each sequence, in alternation between two extreme thitherto-unprinted tonal values of the sequence;
whereby for each colorant, to provide a roughly constant printing activity during the printing step:
highest and lowest tones appear side by side at one end of each sequence, and
two closest-valued middle tones appear side by side at an opposite end of each sequence.

18. The method of claim 16, wherein:
the printing step comprises printing the patches, within each sequence, in alternation between two most-nearly-central thitherto-unprinted tonal values of the sequence;
whereby for each colorant, to provide a roughly constant printing activity during the printing step:
two closest-valued middle tones appear side by side at an one end of each sequence, and
highest and lowest tones appear side by side at an opposite end of each sequence.

19. The method of claim 1, wherein:
the printing step comprises scanning at least one marking printhead along the scanning direction to form the test pattern.

20. An apparatus for printing an image hardcopy on a printing medium; said apparatus comprising:
at least one printhead for marking on such medium;
a processor for controlling the at least one printhead to discharge inkdrops in a pattern to form such image; and
means for color-calibrating the at least one printhead; said means comprising:
portions of the processor for operating the at least one printhead and the carriage to form a color-calibration test pattern, said test pattern being formed on such medium adjacent to at least one reference area,
at least one light source for scanning across the test pattern and the at least one area to illuminate the pattern and the at least one area,
a sensor for scanning across the pattern and at least one area, with the at least one source, to measure illuminated colors in the test pattern and the at least one area,
means for interpreting measurement signals from the sensor, to correct the sensor output signals for drift due to incomplete warmup;

said interpreting means comprising processor portions for:
  isolating measurement-signal segments representing the at least one area to establish a tonal-reference calibration level, and
  applying the calibration level to correct the measurement signals due to the measured illuminated colors.

21. The apparatus of claim 20, further comprising:
a scanning carriage for carrying the at least one printhead across such medium to form such image; and
wherein the processor comprises components for coordinating the carriage and the at least one printhead to form such image.

22. The apparatus of claim 20, wherein:
the light source comprises a light-emitting diode.

23. The apparatus of claim 20, wherein the interpreting means comprise:
an analog-to-digital converter for receiving the measurement signals and deriving therefrom converter output signals representing the measurement signals; and
portions of the processor for interpreting the converter output signals, to correct the converter output signals for drift due to incomplete warmup.

24. The apparatus of claim 20, wherein:
each reference area is an unprinted area of such printing medium;
whereby the tonal-reference calibration level is a medium-point calibration level.

25. The apparatus of claim 24, wherein:
said at least one reference area comprises plural unprinted areas of such printing medium; and
said test pattern is formed on such medium between at least two of said plural unprinted areas.

26. The apparatus of claim 25, wherein:
the at least one printhead comprises plural printheads.

27. The apparatus of claim 24, wherein:
the at least one printhead comprises plural printheads.

28. The apparatus of claim 23, wherein:
the at least one printhead comprises plural printheads.

29. The apparatus of claim 23, wherein:
said at least one reference area comprises plural reference areas; and
said test pattern is formed on such medium between at least two reference areas.

30. An economical apparatus for printing an image hardcopy on a printing medium, and for obtaining near-colorimetric quality although said apparatus has inexpensive components; said apparatus comprising:
  at least one printhead for marking on such medium, said at least one printhead being subject to marking tolerances that require color calibration;
  at least one processor having portions for controlling the at least one printhead to discharge inkdrops in a pattern to form such image; and
  means for color-calibrating the at least one printhead; said means comprising:
    portions of the processor for operating the at least one printhead to form a color-calibration test pattern, said test pattern being formed on such printing medium adjacent to at least one reference area, of such printing medium, that provides a tonal-reference calibration level,
    plural light-emitting diodes for scanning across the test pattern and the at least one reference area to illuminate the pattern and the at least one area, temperature dependence in the diodes leading to drift of illumination level during warmup,
    a sensor for scanning across the pattern and at least one area, with the diodes, to measure illuminated colors in the test pattern and to measure the at least one reference area, whereby the illumination drift leads to drift of measurement signals from the sensor,
    an analog-to-digital converter for receiving the measurement signals, nonlinearities in the converter making measurements of small signal differences on a large signal pedestal undesirable, wherefore the diodes are used in alternation rather than continuously, and therefore never fully complete warmup, and
    means for compensating for incomplete diode warmup;
  said compensating means comprising portions of the processor for interpreting output signals from the converter, to correct the converter output signals for drift due to said incomplete warmup;
  said interpreting portions comprising processor portions for:
    isolating converter-signal segments representing tonal-reference calibration level, and
    applying the tonal-reference calibration-level segments to correct the measurement signals due to the measured illuminated colors;
  whereby the apparatus accommodates the printhead tolerances and diode temperature dependence, and avoids the converter nonlinearities.

31. The apparatus of claim 30, for use in image printing based upon image data received or generated by the apparatus; and further comprising:
  a scanning carriage for carrying the at least one printhead across such medium to form such image;
  wherein the at least one processor also has portions for coordinating the carriage and the at least one printhead to form such image; and
  wherein the processor controlling portions comprise portions for performing calculations used respectively in:
    color corrections to such image data if desired,
    rendition to exchange resolution for color depth,
    ink depletion to avoid placement of excessive colorant on the printing medium, and
    printmasking to allocate inkdrop discharge as between successive scans of the scanning carriage.

32. The apparatus of claim 30, wherein:
the processor operating portions comprise means for printing said test pattern in each of plural colors respectively, and for each color as a sequence of color patches at various tonal levels; and
the processor interpreting portions comprise means for applying the sensor reference-area measurements to adjust the sensor measurement for substantially each color patch in at least one of the plural test patterns.

33. The apparatus of claim 32, wherein:
the applying means comprise means for applying the sensor reference-area measurements to adjust the sensor measurement for substantially each color patch in substantially all of the plural test patterns.

34. The apparatus of claim 33, wherein:
the applying means comprise means for interpolation between two sensor reference-area responses obtained at ends of each sequence of patches.

35. The apparatus of claim 34, wherein the interpolation is based upon an interpolation model selected from the group consisting of:
  an assumed mathematical function interrelating responses at ends of each sequence with scan positions within each sequence; and a succession of levels separately measured for media-point responses during a preliminary precalibration scan.

36. The apparatus of claim 35, wherein:

the preliminary precalibration scan is not made automatically in field operations but only at the factory.

37. The apparatus of claim 35, wherein:

the preliminary precalibration scan is made automatically in field operations but is not applied in absolute terms, and rather is used only for proportioning interpolation between two responses obtained at ends of each sequence of patches.

38. The apparatus of claim 35, wherein:

the processor operating portions include means for printing the patches, within each sequence, in alternation between two extreme thitherto-unprinted tonal values of the sequence;

whereby for each color, to roughly stabilize the temperature of an associated printhead:

highest and lowest tones appear side by side at one end of each sequence, and two closest-valued middle tones appear side by side at an opposite end of each sequence.

39. The apparatus of claim 35, wherein:

the processor operating portions include means for printing the patches, within each sequence, in alternation between two most-nearly-central thitherto-unprinted tonal values of the sequence;

whereby for each color, to roughly stabilize the temperature of an associated printhead:

two closest-valued middle tones appear side by side at an one end of each sequence, and highest and lowest tones appear side by side at an opposite end of each sequence.

40. An apparatus for printing an image hardcopy on a printing medium; said apparatus comprising:

at least one printhead for marking on such medium;

a processor for controlling the at least one printhead to discharge inkdrops in a pattern to form such image; and means for color-calibrating the at least one printhead; said means comprising:

portions of the processor for operating the at least one printhead to form a color-calibration test pattern on such medium, at least one light source for scanning across the test pattern to illuminate the pattern at plural scan positions, a sensor for scanning across the pattern, with the at least one source, to measure illuminated colors at the scan positions, guide means establishing a spacing between such printing medium and at least a portion of the sensor; said guide means being subject to tolerances that lead to nonuniformity of the spacing, at the scan positions, means for interpreting measurement signals from the sensor, to correct the sensor output signals for variation due to said nonuniformity of the spacing;

said interpreting means comprising processor portions for:

also scanning the sensor across an unprinted region of the medium to obtain respective unprinted-medium tonal-reference calibration levels for the scan positions, isolating measurement-signal segments representing the tonal-reference calibration levels for the scan positions, and applying the isolated signal segments to correct the measurement signals due to the measured illuminated colors.

* * * * *

UNITED STATES PATENT AND TRADEMARK OFFICE
CERTIFICATE OF CORRECTION

PATENT NO. : 7,023,581 B2  
APPLICATION NO. : 09/919260  
DATED : April 4, 2006  
INVENTOR(S) : Pau Soler et al.

It is certified that error appears in the above-identified patent and that said Letters Patent is hereby corrected as shown below:

On the Title page, in field (75), in "Inventors", in column 1, line 2, delete "Vinas" and insert -- Vinyas --, therefor.

In column 1, line 50, delete "calorimetrically" and insert -- colorimetrically --, therefor.

In column 1, line 64, delete "calorimeter" and insert -- colorimeter --, therefor.

In column 7, line 25, delete ""near-colormetric"" and insert -- "near-colorimetric" --, therefor.

In column 13, line 65, delete "calorimeter" and insert -- colorimeter --, therefor.

In column 14, line 23, delete "calorimetric" and insert -- colorimetric --, therefor.

In column 18, line 11, delete "y" and insert -- Y --, therefor.

In column 18, line 20, after "however," delete "ever,".

In column 21, line 37, in Claim 9, insert -- the -- before "printing".

Signed and Sealed this

Nineteenth Day of May, 2009

JOHN DOLL  
*Acting Director of the United States Patent and Trademark Office*